Aug. 21, 1962  K. CECH  3,050,593
PHONOGRAPH, PARTICULARLY SOUND TAPE APPARATUS
Filed Nov. 8, 1960

Inventor:
Karl Cech
By Ernest F. Marmaduke
Attorney

United States Patent Office 3,050,593
Patented Aug. 21, 1962

3,050,593
PHONOGRAPH, PARTICULARLY SOUND TAPE APPARATUS
Karl Cech, Modling, Austria, assignor to Karl Vockenhuber, Vienna, Austria
Filed Nov. 8, 1960, Ser. No. 68,104
Claims priority, application Austria Nov. 10, 1959
5 Claims. (Cl. 179—100.2)

The present invention relates to a phonograph, particularly a sound tape apparatus including a loud-speaker as well as a driving device in which a mass of inertia is provided for the purpose of stabilizing the speed of the sound carrier.

There is a tendency to design home-sound tape apparatus and such portable apparatus as compact, small and light as possible.

Difficulties are encountered herein, in the first place, in the placing of the mass of inertia and of the loud-speaker, the design of which must be relatively large in order to assure a good sound quality, and which parts are disposed conventionally below the chassis plate. The known sound tape apparatus solve this problem merely by compromise since the smaller design brought about a lesser quality of the loud-speaker, as well as, in consequence of the reduced mass of inertia, a lesser stabilization of the speed of the sound carrier.

It is, therefore, one object of the present invention to provide a phonograph, particularly a sound tape apparatus which avoids the disadvantages of the known devices by pivotally mounting the entire loud-speaker or at least its magnet on a shaft, serving, thereby, as mass of inertia. Thus it is possible to use, in spite of small dimensions of the apparatus, a relatively big loud-speaker and to choose a large order of the moment of inertia for the mass of inertia. The total weight of the entire apparatus is simultaneously reduced.

It is another object of the present invention to provide a phonograph, particularly a sound tape apparatus wherein, advantageously, the magnetic system of the loud-speaker only constitutes the mass of inertia, whereas the loud-speaker membrane and the field coil are immovably mounted. This expedient is extremely suitable, because a feeding of current to the loud-speaker over slip rings is avoided. No reduction of the moment of inertia is brought about thereby, compared with a structure in which the loud-speaker is used in its entirety as mass of inertia, since the moment of inertia of the membranes and of the securing member is neglectable over that of the magnetic system.

It should be emphasized, however, that the feeding of the electric current to the moving coil by means of slip rings is certainly possible. The use of slip rings of a noble metal, conventional in measuring apparatus, with a plurality of brushes of noble metal assures a completely safe contact and very small transition resistances.

The mounting and centering of the loud-speaker membrane is performed analogously with the previously used method. No appreciably greater precision is required for the centering than that applied for the normal loud-speaker constructions. It is merely important for the subject matter of the present invention, that the shaft connected with the loud-speaker magnets is well supported and has a very small bearing clearance. These are, however, requirements which must be met by any other bearing of such shaft, so that a constructively higher standard for the bearing is not present.

It is yet another object of the present invention to provide a phonograph, particularly a sound tape apparatus, wherein advantageously the magnetic system of the loud-speaker is secured directly to its shaft to rotate with the latter, whereby the shaft, with respect to magnetic sound recording apparatus, consists of non-magnetic material, so that during magnetic sound recording no interference takes place by the magnetic field of the loud-speaker.

It is also still another object of the present invention to provide a phonograph, particularly a sound tape apparatus, wherein the rotatably mounted part of the loud-speaker is operatively connected with the drive shaft of the sound carrier by means of a friction drive. In this arrangement, the part of the loud-speaker operating as a mass of inertia can be subjected to faster rotation, so that the moment of inertia is increased in relation to the driving shaft. This expedient assures thus extremely high stabilization of the speed of the sound carrier.

A further advantage of this structure resides in the fact that the shaft can be made of steel and that a greater freedom in the design is brought about with respect to the arrangement of the loud-speaker.

With these and other objects in view which will become apparent in the following detailed description, the present invention will be clearly understood in connection with the accompanying drawing, in which.

Figure 1:
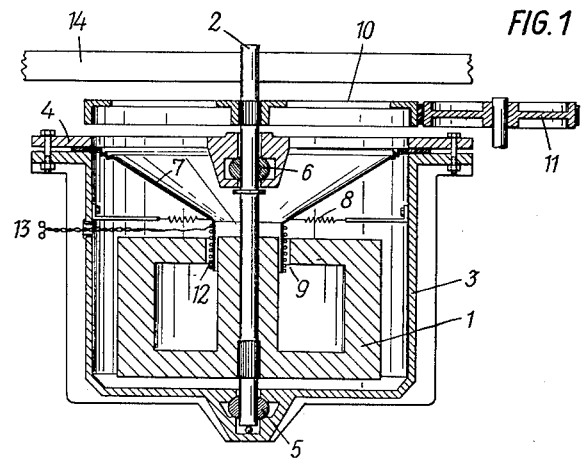
FIGURE 1 is an axial section of a sound tape apparatus, designed in accordance with the present invention.

Referring now to the drawing, the present sound tape apparatus comprises a loud-speaker, the magnetic system 1 of which is secured to the shaft 2, and which loud-speaker is surrounded by the casing parts 3 and 4 of aluminum or plastic. The bearing 5 of the shaft 2 is disposed in the casing part 3. The casing part 4 is of annular shape. The pivot bearing 6 of the shaft 2 is connected to the casing part 4 by three stays. The cone-shaped membrane 7 of the loud-speaker is secured to the casing part 3 and is centered by a spider member 8 relative to the air gap 9 of the rotating magnetic system 1. The exerting winding 12 of the loud-speaker membrane 7 is connected with an amplifier (not shown) by means of the terminals 13. The shaft 2 is operatively connected with a driving motor (not shown) by means of the friction wheels 10 and 11, and drives the sound tape 14, which is pressed onto the shaft 2 by a pressing roller (not shown). Upon using this drive in magnetic sound recording apparatus, it is necessary, that the shaft 2 is made of non-magnetic material, so that an interference with the magnetic recording by the field of the loud-speaker magnet is avoided.

Figure 2:
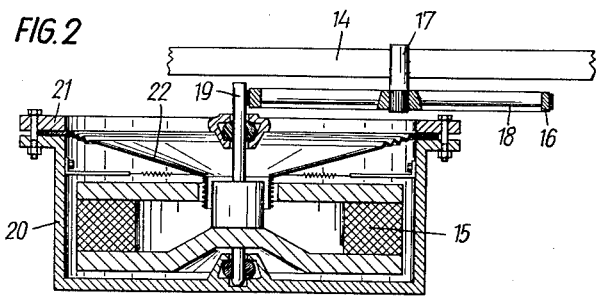
FIG. 2 is an axial section of another embodiment of the sound tape apparatus.

Referring now to FIG. 2 of the drawing, where a second embodiment of the present invention is disclosed, the rotatable magnetic system 15 of the loud-speaker is operatively connected to the shaft 19 by means of a friction wheel 16. In order to make possible a good sound projection, the friction wheel 16 is provided with perforations 18. The shaft 19 of the magnetic system 15 is mounted in both casing parts 20 and 21, the casing part 21 being of star-shape. The membrane 22 of the loud-speaker is supported on the casing part 21 in the same manner as disclosed in connection with the first embodiment.

Figure 3:
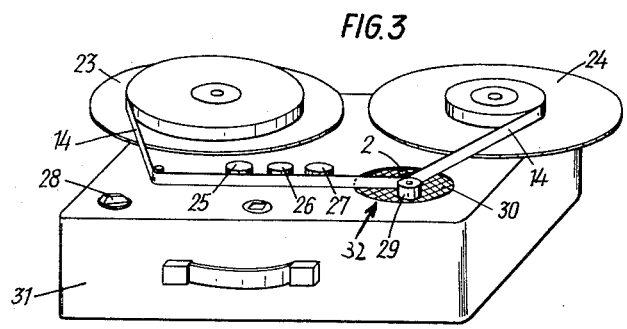
FIG. 3 is a perspective front view of the sound tape apparatus of FIG. 1.

Referring again to the drawing, and in particular to FIG. 3, a sound tape apparatus is disclosed which has a loud-speaker arrangement, as shown in FIG. 1. The sound tape 14 is fed away from a spool 23 passing a magnetic erasing head 25, which is erasing upon a sound recording the original recording on the sound tape 14. The sound tape is then passing the recording head 26, the play back head 27, and then the shaft 2 with exactly constant speed. In order to assure the necessary friction between the shaft 2 and the sound tape 14, the latter is pressed against the shaft 2 by means of a resilient pressure roller 29. The sound tape 14 is wound up on the spool 24, after passing the shaft 2. The different functions of the apparatus, recording, play back, rewinding, etc. can be controlled by means of a switch 28. The shaft 2 is disposed in a circular opening 32 of the casing 31 of the sound tape apparatus, the opening 32 being covered with a sound transmitting material. By this arrangement a free sound projection of the loud-speaker is assured and likewise the entering of dust etc. into the inner chamber of the apparatus is avoided.

The embodiment, disclosed in FIG. 2, is particularly suitable for micro sound tape apparatus, since for these apparatus loud-speakers having a possibly light magnetic system have to be used, in order to assure a low weight. By the provision of a friction drive, it is possible to obtain a faster rotation of the mass of inertia, so that the moment of inertia effective on the shaft is increased.

The invention is not limited to the disclosed embodiments. There are rather numerous variations possible, without departing from the scope of the present invention. Thus, by example the casing 3 and 20, respectively, of the loud-speaker has an opening and the drive of the loud-speaker magnet can be performed directly by a friction wheel or by a drive belt.

The invention can also be used in the same way and with the same advantages for sound recording apparatus comprising blade-shaped or sleeve-shaped sound carriers, as well as for gramophones and sound film apparatus, the scope of the present invention being determined by the objects and the claims.

I claim:

1. A phonograph, particularly a sound tape apparatus, comprising a movable sound carrier, means driving said sound carrier, means for stabilizing the movement of said sound carrier, said stabilizing means comprising a rotatable mass of inertia in driving connection with said sound carrier, an electromagnetic loud-speaker comprising a magnetic system defining a cylindrical air gap and having cylindrical surfaces, a cylindrical moving coil movable within said air gap adjacent said cylindrical surfaces of said magnetic system, a membrane operatively connected with said moving coil, said moving coil performing upon energization an axial movement, at least said magnetic system of said loud-speaker being mounted for rotation about the longitudinal axis of said cylindrical air gap and in driving connection with said sound carrier, and said magnetic system constituting said means for stabilizing the movement of said sound carrier.

2. A phonograph, particularly a sound tape apparatus, comprising a movable sound carrier, means driving said sound carrier, means for stabilizing the movement of said sound carrier, said stabilizing means comprising a rotatable mass of inertia in driving connection with said sound carrier, an electromagnetic loud-speaker comprising a magnetic system defining a cylindrical air gap and having cylindrical surfaces, a cylindrical moving coil movable within said air gap adjacent said cylindrical surfaces of said magnetic system, a membrane operatively connected with said moving coil, the outer edges of said membrane being fixed with respect to said phonograph, said moving coil performing upon energization an axial movement, the magnetic system of said loud-speaker being mounted for rotation about the longitudinal axis of said cylindrical air gap and with respect to said non-rotatable moving coil, said magnetic system being in driving connection with said sound carrier and constituting said means for stabilizing the movement of said sound carrier.

3. A sound tape apparatus comprising a sound tape, a shaft driving said sound tape, means for stabilizing the movement of said sound tape, said stabilizing means comprising a rotatable mass of inertia in driving connection with said sound tape, an electromagnetic loud-speaker comprising a magnetic system defining a cylindrical air gap and having cylindrical surfaces, a cylindrical moving coil movable within said air gap adjacent said cylindrical surfaces of said magnetic system, a membrane carrying said moving coil, the outer edges of said membrane being fixed with respect to said sound tape apparatus, said moving coil performing upon energization an axial movement, said magnetic system of said loud-speaker being mounted for common rotation with said shaft with respect to said non-rotatable moving coil, said cylindrical air gap being disposed coaxially about said shaft, and said magnetic system constituting said means for stabilizing the movement of said sound tape.

4. The sound tape apparatus, as set forth in claim 3, wherein said shaft is of non-magnetic material.

5. A sound tape apparatus comprising a sound tape, a first shaft driving said sound tape, means for stabilizing the movement of said sound tape, said stabilizing means comprising a rotatable mass of inertia in driving connection with said sound tape, an electromagnetic loud-speaker comprising a magnetic system defining a cylindrical air gap and having cylindrical surfaces, a cylindrical moving coil movable within said air gap adjacent said cylindrical surfaces of said magnetic system, a membrane carrying said moving coil, the outer edges of said membrane being fixed with respect to said sound tape apparatus, said moving coil performing upon energization an axial movement, a second shaft, said magnetic system being mounted for common rotation with said second shaft, said cylindrical air gap being disposed coaxially about said second shaft, a friction wheel mounted on said first shaft and drivingly engaging said second shaft, and said magnetic system constituting said means for stabilizing the movement of said sound tape.

No references cited.